United States Patent [19]

Daniels

[11] Patent Number: 4,523,117

[45] Date of Patent: Jun. 11, 1985

[54] DYNAMOELECTRIC MACHINE WITH SELF-SEALING LEAD WIRE GROMMET

[75] Inventor: Nicholas R. Daniels, St. Louis, Mo.

[73] Assignee: Emerson Electric Co., St. Louis, Mo.

[21] Appl. No.: 916,076

[22] Filed: Jun. 16, 1978

[51] Int. Cl.³ .................. H02K 5/10; H02G 3/18; H01B 17/30
[52] U.S. Cl. .................. 310/71; 174/65 G; 174/153 G; 174/155; 310/88
[58] Field of Search ............ 174/65 G, 152 G, 153 G, 174/155, 156, 65 R, 81; 310/71, 88, 89; 16/2; 248/56, 67.5, 68 R, 68 CB; 277/178; 339/103 B, 107

[56] References Cited

U.S. PATENT DOCUMENTS

| | | | |
|---|---|---|---|
| 2,000,374 | 5/1935 | Buchanan | 174/155 X |
| 2,686,216 | 8/1954 | Appleton et al. | 174/81 |
| 2,774,894 | 12/1956 | Antonidis et al. | 310/71 |
| 3,310,692 | 3/1967 | Rodwick | 310/71 |
| 3,499,097 | 3/1970 | Widstrand | 174/153 G X |
| 3,502,917 | 3/1970 | Bizoe | 174/153 G X |
| 3,742,119 | 6/1973 | Newman | 174/155 X |

FOREIGN PATENT DOCUMENTS

| | | | |
|---|---|---|---|
| 2155231 | 5/1973 | Fed. Rep. of Germany | 174/153 G |
| 2629426 | 1/1978 | Fed. Rep. of Germany | 174/65 G |
| 306437 | 3/1933 | Italy | 174/65 G |
| 476736 | 12/1952 | Italy | 174/153 G |
| 162122 | 2/1958 | Sweden | 174/65 G |

Primary Examiner—Laramie E. Askin
Attorney, Agent, or Firm—Polster, Polster and Lucchesi

[57] ABSTRACT

A self sealing motor lead wire grommet comprising a pair of identical molded plastic grommet members insertable into a slot or notch of the shell of an electric motor. The grommet members each have wire receiving notches in their inner abutting edges and grooves along their other edges for receiving a portion of the shell adjacent the slot. In the preferred embodiment the outer grommet member is inserted in the slot and is engaged by the end shield of the motor. Consequently, when the end shield is secured in position on the shell, both grommet members are clamped together in tight engagement with the shell and the end shield, and the lead wires are clamped in their respective wire receiving notches between the abutting grommet members thereby to close or seal the lead wire pass-through slot in the motor and to seal the lead wires to the grommet members.

2 Claims, 6 Drawing Figures

DYNAMOELECTRIC MACHINE WITH SELF-SEALING LEAD WIRE GROMMET

BACKGROUND OF THE INVENTION

This invention relates to a system for sealing the electrical leads of an electric motor at the point where they pass through the shell or housing of the motor. More specifically, this invention relates to a grommet which sealably clamps on the lead wires and which sealingly closes the lead wire passthrough opening in the motor assembly of the motor.

In the operation of electric motors in environments subject to airborne grit or sand particles (such as under desert operating conditions) it is vital that this airborne grit and sand be kept out of the motor so as to protect the motor bearings and other components within the motor. Conventionally, a "totally enclosed" motor is used for this purpose, for example. However, even totally enclosed electric motors must have some means for passing the motor lead wires through the shell of the motor. This is typically accomplished by providing an opening in the motor shell and by installing a wiring bushing in this opening. The bushing commonly has a plurality of passages for the reception of the motor lead wires. These prior art wire bushings, however, did not always seal the lead wires or did not always seal the opening in the motor shell. If the lead wires or the opening are improperly sealed, dirt and other airborne grit can enter the motor which in turn can significantly shorten the service life of the motor. In many instances, the lead wires of the prior art motors were sealed with respect to the bushing and the latter was sealed to the motor shell by means of a hot melt adhesive or potting compound applied to the lead wires so as to seal them. While this potting operation was generally successful in sealing the leads with respect to the bushing, it required a good deal of extra time during assembly of the motor and thus was costly and it was also a messy operation. Still further, these potted lead wires are a hinderance in the field service of these prior motors because it prevents field servicemen from readily removing the wires from the bushing and from reinserting them upon completion of the repair.

SUMMARY OF THE INVENTION

Among the several objects and features of this invention may be noted the provision of a motor lead wire passthrough grommet for use on an electric motor which self-seals relative to the lead wires and closes the lead wire passthrough opening in the motor upon assembly of the motor end shields on the motor shell;

The provision of such a grommet which eliminates the requirement of potting the lead wires to the grommet;

The provision of such a grommet which grips the lead wires and provides at least some strain relief of the lead wires relative to the motor shell;

The provision of such a grommet which may be readily installed on the motor during fabrication of the motor;

The provision of such a grommet which may be readily removed from the lead wires upon disassembly of the motor and which may be readily reinstalled to sealably grip the lead wires upon reassembly of the motor; and The provision of such a grommet which may be inexpensively manufactured and which requires no specialized equipment or training of personnel for installation during assembly of an electric motor incorporating the grommet.

Briefly, a lead wire pass through grommet of this invention is intended for use in an electric motor or other electrical apparatus for sealably engaging the lead wires of the motor and for closing a lead wire pass through opening in the motor. More specifically, the motor comprises a shell having at least one end shield adapted to be secured to the shell so as to close an open end thereof. The shell has a slot therein constituting the above noted pass through opening. The grommet of this invention comprises a pair of identical grommet members adapted to be sealingly fitted together along an inner abutting edge of each of the grommet members, each of these grommet members having at least one lead wire receiving notch in its inner edge. Each of the wire receiving notches in each of the grommet members cooperates with a respective lead wire receiving notch in the other grommet member so as to form a wire receiving opening substantially surrounding and sealably engaging a respective lead wire inserted therein. Each of the grommet members further has a groove therein for reception of a part of the motor shell adjacent the pass through opening in the motor shell with one of the grommet members being installable in the slot with its groove receiving a portion of the shell adjacent the slot and with its inner edge facing outwardly of the slot. The other of the grommet members is insertable into the slot with its inner edge facing the inner edge of the previously installed grommet member, with at least a portion of its groove receiving a portion of the shell adjacent the slot. The pair of grommet members is so sized in relation to the slot in the shell as to close the slot and to be held in sealing engagement with the lead wires received in their wire receiving notches upon assembly of the motor. Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
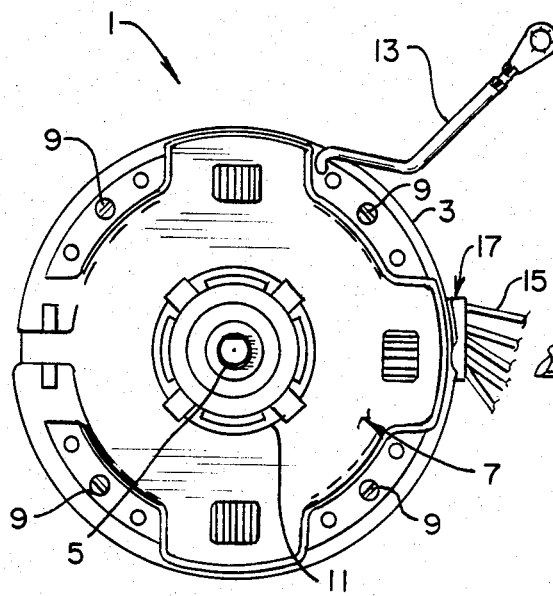
FIG. 1 is an end elevational view of an enclosed electric motor having a self-sealing lead wire grommet of this invention installed thereon.
Figure 2:
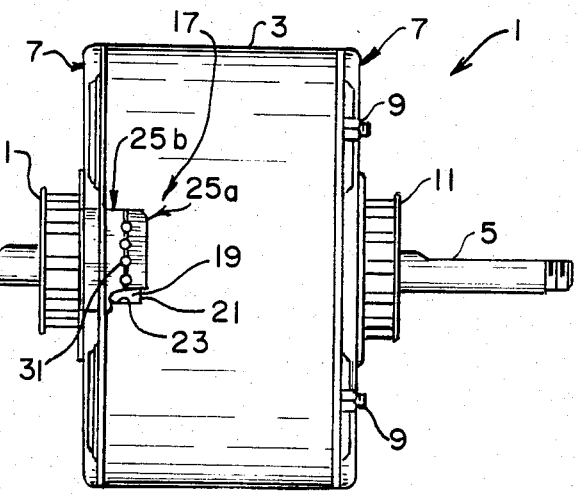
FIG. 2 is a side elevational view of the motor shown in FIG. 1 illustrating a pair of grommet members installed in a pass-through opening in the motor for closing the opening and for sealably gripping the motor lead wires.
Figure 3:
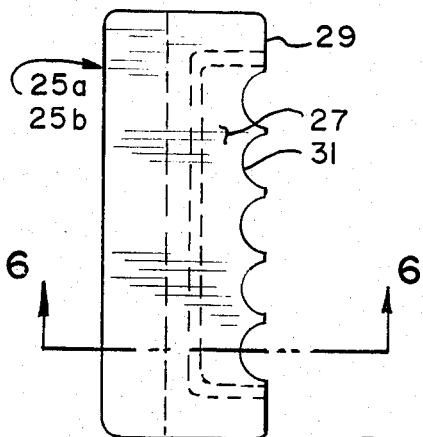
FIG. 3 is an enlarged plan view of one of a pair of gromment members constituting the grommet of this invention.
Figure 4:
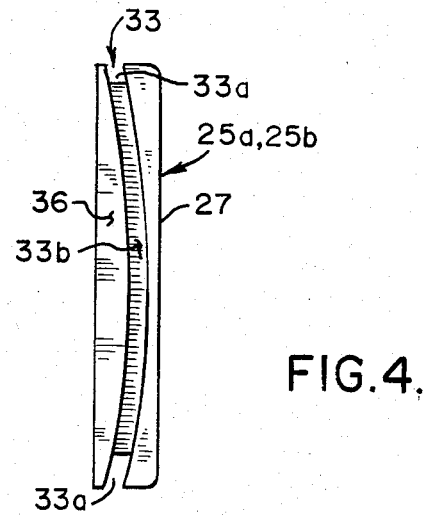
FIG. 4 is a left side elevational view of the grommet member shown in FIG. 3 and illustrating an arc shaped groove therein.
Figure 5:
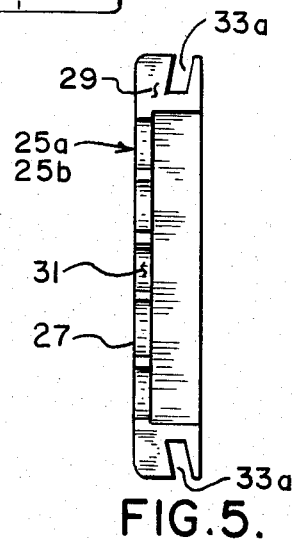
FIG. 5 is a right side elevational view of FIG. 3.

Referring now to the drawings, and particularly to FIGS. 1 and 2, an electric motor is indicated in its entirety by reference character 1 and is shown to have an open ended, cylindric shell or housing 3. A stator (not shown) is housed within shell 3 and a rotor (also not shown) is affixed to a rotor shaft 5. The ends of the shell are closed by end shields 7 which are sealably secured to the ends of the housing by tie bolts 9 which extend through shell 3 from one end shield to the other. Shaft 5 is shown to extend out beyond the end shields and to be journalled for rotation about its longitudinal axis by means of anti-friction bearings sealed within bearing caps 11. A ground lead 13 is electrically connected to one of the end shields and a plurality of motor lead wires 15 extend out through one side of shell 3. Of course, suitable mounting brackets (not shown) may be provided for the motor.

In accordance with this invention, a self-sealing motor lead wire pass through grommet, as generally indicated at 17, is provided for sealing lead wires 15 relative to shell 3 and for closing an opening or slot 19, constituting a motor lead wire pass through opening, in shell 3 thereby to prevent airborne sand and grit from entering the interior of the motor. As shown in FIG. 2, slot 19 is an open ended slot formed at an outer end of shell 3. Slot 19 is generally rectangular in that it is defined by a base edge 21 generally parallel to the end of the motor shell and by side edges 23 perpendicular to the end of the shell and to base edge 21.

Figure 6:
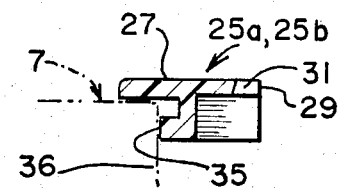
FIG. 6 is a cross sectional view taken along 6—6 of FIG. 3 illustrating the grommet member in cross section and showing the motor end shield (in phantom) engaging a portion of the grommet member.

Grommet 17 is constituted by a pair of identical grommet members 25a, 25b insertable in slot 19 so as to be engageable with the portion of shell 3 adjacent the slot, with a portion of end shield 7 adjacent the slot, and with lead wires 15 which pass therethrough thereby to prevent airborne grit and dirt from entering the motor. Preferably, grommet members 25a, 25b are molded of a suitable synthetic resin material, such as a nylon resin, which is a good electrical insulator. As shown in FIGS. 3–6, each grommet member includes a top plate 27 so sized as to extend out beyond the edges of slot 19 in shell 3 and out beyond the interface between the end of shell 3 and end shield 7. In FIG. 2 the grommet members are shown to be oriented in slot 19 so that they abut along an inner edge or end, as indicated at 29 in FIGS. 3–6. A plurality of wire receiving notches, as indicated at 31, is provided in the inner edge or end of each of the grommet members. These wire receiving notches are part circular and preferably are somewhat smaller than the insulation on lead wires 15 which are to be received therein for insuring that the grommet members sealingly grip the lead wires upon assembly of grommet 17 in a manner as will appear. As best shown in FIG. 2, corresponding wire receiving notches 31 in the abutting pair of grommet members 25a, 25b cooperate to form a wire receiving opening, there being one such opening for each lead wire to be passed through the grommet. As shown in FIG. 6, the edge of plate 27 forming notches 31 is beveled so that it contacts the insulation of the lead wire 15 passing therethrough along a line of contact so as to ensure sealing of the wire. Alternatively, a V-shaped notch or a protruding bead (not shown) may be provided on this notch edge to ensure sealing engagement between the grommet and the wire.

Each of the grommet members 25a, 25b has a groove, as generally indicated at 33, for receiving a portion of shell 3 adjacent slot 19. More specifically, groove 33 includes side groove portions 33a at opposite sides of each grommet member (see FIGS. 4 and 5) for receiving side edges 23 of shell 3 and an end groove portion 33b in the outer end thereof opposite inner edge 29 for receiving the arc shaped base edge 21 of shell 3. As shown in FIG. 6, each of the grommet members has a surface 35 on its outer end opposite its inner end 29 adapted to be engaged by a shoulder 36 on end shield 7. Upon installation of a first grommet member 25 in slot 19, its side groove portions 33a receive portions 23 of shell 3 along the sides of slot 19 and its outer end groove portion 33b receives the arc-shaped base edge 21 of the slot. With the other or second grommet member 25b installed in the slot, shoulder 36 on end shield 7 (see FIG. 6) is shown to abut surface 35 of member 25b and to push both grommet members inwardly into the slot.

For installation of grommet 17 of this invention on motor 1, a first or inner grommet member 25a is inserted in slot 19 so that the edge portions 23 of the slot engage its groove portions 33a and the grommet member is pushed to the back of the slot with its end groove portion 33b receiving the arc-shaped base edge 21 of the slot. With the first grommet so installed in the slot, its inner edge 29 faces outwardly. Lead wires 15 are then inserted in notches 31 of the first grommet member and a second grommet member 25b is inserted in the slot with its inner edge 29 facing toward the inner edge of the first installed grommet member and with its side grooves 33a receiving the portions of side edges 23 of slot 19 disposed between the first installed grommet member and the open end of shell 3. Wire receiving notches 31 in the second-installed grommet member 25b cooperate with the wire receiving notches in first installed grommet member 25a and thus the top plate 27 of both of the grommet members substantially surround each of the lead wires. End shields 7 are then installed on shell 3 of the motor with the shoulder 36 of one of the end shields engaging surface 35 of the second installed grommet member 25b thereby pushing both of the grommet members into slot 19 so the grommet members are in inner side-to-inner side abutting, sealing relation thus clamping and sealing wires 15 relative to the grommet members and effecting the closure of lead wire pass through slot 19 thereby to prevent the entrance of airborne dirt or grit into the motor. In this manner, motor lead wires 15 and the pass through opening are sealed by the grommet members without the use of hot melt potting sealants or the like and thus the grommet of this invention is self-sealing. It will also be noted that upon disassembly of motor 1, grommet members 25a, 25b and wires 15 may be readily removed from the motor without damage and can be readily resealed to the wires and to the motor shell and upon reassembly utilizing the same parts. Because the lead wires are gripped tightly by the grommet members and because the grommet members are held securely on shell 3, grommet 17 of this invention not only seals the lead wires with respect to shell 3, but also provides strain relief for the wires so that forces applied to the wires are taken up by the grommet rather than by the electrical connection of the lead wires inside the motor.

While in the preferred installation of grommets 17 of this invention, as above-described, the grommets were shown to be installed in an open-ended slot at the end of the motor shell, it will be understood that in a two-piece shell, the grommets could also be installed in an opening at the intersection of the shell parts so as to be clampingly secured in place upon assembly of the motor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a dynamoelectric machine comprising a shell and at least one end shield engaged with the shell at one end thereof, a plurality of lead wires, said shell having an open ended slot at said one end thereof constituting a pass-through opening in the shell through which said lead wires for the motor are routed, wherein the improvement comprises: a lead wire pass-through grommet sealably engaging said lead wires and sealably closing said pass-through opening, said grommet comprising a pair of identical grommet members each having an inner end and an outer end, each of said grommet members having a plurality of lead wire receiving notches in its inner end and grooves in its sides and in the outer end thereof for reception of portions of said shell defining the sides and end of said slot, one of said grommet members being installed in said slot with the grooves in its sides and outer end receiving portions of said shell adjacent said slot and with its inner end facing outwardly of said slot, the other of said grommet members being installed in said slot with its inner end facing in toward the inner end of the previously installed grommet member and with the grooves in its sides receiving portions of said shell adjacent said slot, said pair of grommet members being so sized in relation to said slot so as to substantially close the slot, said grommet members being further to sized that the outer end of said other grommet member is engaged solely by said end shield, the inner ends of both of said grommet members being forced into sealing engagement with one another by said end shield, and the sides of both grommet members and the outer end of said one grommet member being forced into sealing engagement with the shell by said end shield, said lead wires being received in said notches and the portions of the inner ends of the grommet members defining said lead wire receiving notches being so structured so as to be forced into clamping, sealing engagement with said lead wires received therein along a line of contact thereby to seal the lead wires with respect to the grommet members and to provide strain relief for the said lead wires.

2. In a dynamoelectric machine as set forth in claim 1 wherein said shell is cylindrical and the grooves in the ends of each of said grommet members are arcuately-shaped to correspond with the cylindrical shape of said shell.

* * * * *